(12) United States Patent
Huang et al.

(10) Patent No.: US 11,009,133 B2
(45) Date of Patent: May 18, 2021

(54) VACUUM RELEASE VALVE

(71) Applicant: CHANG PENG METAL INDUSTRIAL CO., LTD., Changhua County (TW)

(72) Inventors: Cheng-Feng Huang, Changhua County (TW); Yu-Lin Huang, Changhua County (TW)

(73) Assignee: CHANG PENG METAL INDUSTRIAL CO., LTD., Changhua County (TW)

( * ) Notice: Subject to any disclaimer, the term of this patent is extended or adjusted under 35 U.S.C. 154(b) by 126 days.

(21) Appl. No.: 16/141,191

(22) Filed: Sep. 25, 2018

(65) Prior Publication Data

US 2020/0096117 A1  Mar. 26, 2020

(51) Int. Cl.
*F16K 15/14* (2006.01)
*F16K 3/28* (2006.01)

(52) U.S. Cl.
CPC .............. *F16K 3/28* (2013.01); *F16K 15/144* (2013.01)

(58) Field of Classification Search
CPC ...... F16K 15/14; F16K 15/144; F16K 15/145; F16K 15/147; F16K 15/185; F16K 15/202; F16K 24/06; F16L 37/38; F16L 55/055; Y10T 137/3258; Y10T 137/3294; Y10T 137/3331; Y10T 137/7843; Y10T 137/7882; Y10T 137/7883; Y10T 137/7884; Y10T 137/7885

See application file for complete search history.

(56) References Cited

U.S. PATENT DOCUMENTS

| | | | | |
|---|---|---|---|---|
| 2,270,737 A | * | 1/1942 | Langdon | F16K 15/144 137/218 |
| 2,347,988 A | * | 5/1944 | Burke | F16K 15/147 137/217 |
| 2,382,427 A | * | 8/1945 | Langdon | E03C 1/108 137/218 |
| 2,524,764 A | * | 10/1950 | Burke | F16K 15/147 137/217 |
| 2,787,282 A | * | 4/1957 | Langdon | E03C 1/108 137/218 |
| 4,436,519 A | * | 3/1984 | O'Neill | A61M 39/0606 604/175 |
| 9,719,606 B1 | * | 8/2017 | Yang | F16K 15/063 |

\* cited by examiner

*Primary Examiner* — Hailey K. Do (57) ABSTRACT

A vacuum release valve includes: a tube body and an elastic valve. The tube body is provided with at least one venting opening, and the tube body has a stopping portion at one end of the venting opening and a flange at the other end. The elastic valve is provided with a ring, and the ring has a tubular portion. The tubular portion is retracted to form two inclined surfaces and a linear gap. The elastic valve is installed in the tube body, and the ring and the tubular portion respectively press against the stopping portion and the flange of the tube body. When the tubular portion is elastically deformed due to the vacuum suction, the venting opening communicates with the output end, and then the external air is introduced. The inclined surface can withstand reverse water pressure and close the linear gap and the venting opening.

5 Claims, 8 Drawing Sheets

FIG. 10

VACUUM RELEASE VALVE

1. FIELD OF INVENTION

The present invention relates to a water valve, and more particularly to a vacuum release valve

2. DESCRIPTION OF RELATED ART

Currently, due to excessive water pressure, negative pressure or vacuumed condition, water pipelines or water equipment may have damages such as sag, crack . . . etc. In order to achieve protection of water pipelines or water equipment, the water pipeline is equipped with a vacuum breaking connector structure. When the above conditions occurs, the vacuum effect can be eliminated by the automatic opening of the vacuum breaking connector structure. Conventional vacuum breaking connector structure usually controls by the direction of water pressure and water flow driving valve plate or the steel ball to generate displacement, which forms water flow and external air introduction. However, it is not difficult to find out that the above-mentioned conventional structure has some shortcomings. The main reasons are as follows: conventional vacuum breaking connector usually utilizes a spring to push against the end of the valve plate or the steel ball, so that the structure is complicated and the production cost is high. Moreover, the complicated structure also causes higher malfunction or water leakage.

Therefore, it is desirable to provide a vacuum release valve to mitigate and/or obviate the aforementioned problems.

SUMMARY OF INVENTION

An objective of present invention is to provide a vacuum release valve, which is capable of improving the above-mention problems.

In order to achieve the above mentioned objective, a vacuum release valve includes: a tube body and an elastic valve. The tube body is provided with at least one venting opening, and the tube body has a stopping portion at one end of the venting opening and a flange at the other end. The elastic valve is provided with a ring, and the ring has a tubular portion. The tubular portion is retracted to form two inclined surfaces and a linear gap. The elastic valve is installed in the tube body, and the ring and the tubular portion respectively press against the stopping portion and the flange of the tube body. When the tubular portion is elastically deformed due to the vacuum suction, the venting opening communicates with the output end, and then the external air is introduced. The inclined surface can withstand reverse water pressure and close the linear gap and the venting opening.

Other objects, advantages, and novel features of invention will become more apparent from the following detailed description when taken in conjunction with the accompanying drawings.

DETAILED DESCRIPTION OF PREFERRED EMBODIMENT

First, please refer to FIGS. 1-5. A vacuum breaking valve comprises a tube body 10 and an elastic valve 20. The tube body 10 has an input end 11 and an output end 12. The tube body 10 has at least one venting opening 13 at a middle section, a stopping portion 14 provided between the input end 11 and the venting opening 13 on an inner wall, and a flange 15 provided between the output end 13 and the venting opening 13 on the inner wall. The input end 11 of the tube body 10 is further provided with an inner threaded section 111, and the output end 12 is provided with an outer threaded section 121. The inner threaded section 111 and the outer threaded section 121 of the tube body 10 are configured for connecting to external pipes. The input end 11 of the tube body 10 is provided with a screw hole 16 passing through the inner threaded section 111 and engaging with a bolt 17, and the bolt 17 passes through the tube body 10. The elastic valve 20 wherein the elastic valve is made of a rubber or a silicon material. The elastic valve 20 further has a ring 21 extending to a tubular portion 22 provided with two inclined surfaces 23 at a narrower end, and the two inclined surfaces 23 form a linear gap 24 there between. The elastic valve 20 is mounted in the tube body 10, the ring 21 and the tubular portion 22 respectively push against the stopping portion 24 and the flange 15 of the tube body 10, such that the venting opening 13 of the tube body 10 is not connected to the output end 12, and the linear gap 24 of the elastic valve 20 faces the output end 12 of the tube body 10. When water flows through the vacuum release valve, the linear gap 24 of the elastic valve 20 is pushed open by water pressure; when water stops flowing, a vacuum suction is generated in the output end 12 which deforms the tubular portion 22 of the elastic valve 20 to cause the venting opening 13 to connect to the output end 12 to break the vacuum. And the flange 15 of the tube body 10 makes partial contact with the tubular portion 22 of the elastic valve 20. Furthermore, a chamber 18 is provided between the tube body 10 and the elastic valve 20, which allows external air to enter into the tube body 10 easier. The elastic valve 20 further has at least one supporting portion 26 corresponding to the two inclined surfaces 23, and the supporting portion 25 pushes against an inside of the tube body 10 to control deformation of the elastic valve 20. The supporting portion 25 is perpendicular to the linear gap 24, and an outer edge of the supporting portion 25 aligns with a surface of the tubular portion 22. The two inclined surfaces 23 of the elastic valve 20 are under reversed pressure and close the linear gap 24 and the venting opening 13 of the output end 12.

Figure 1:
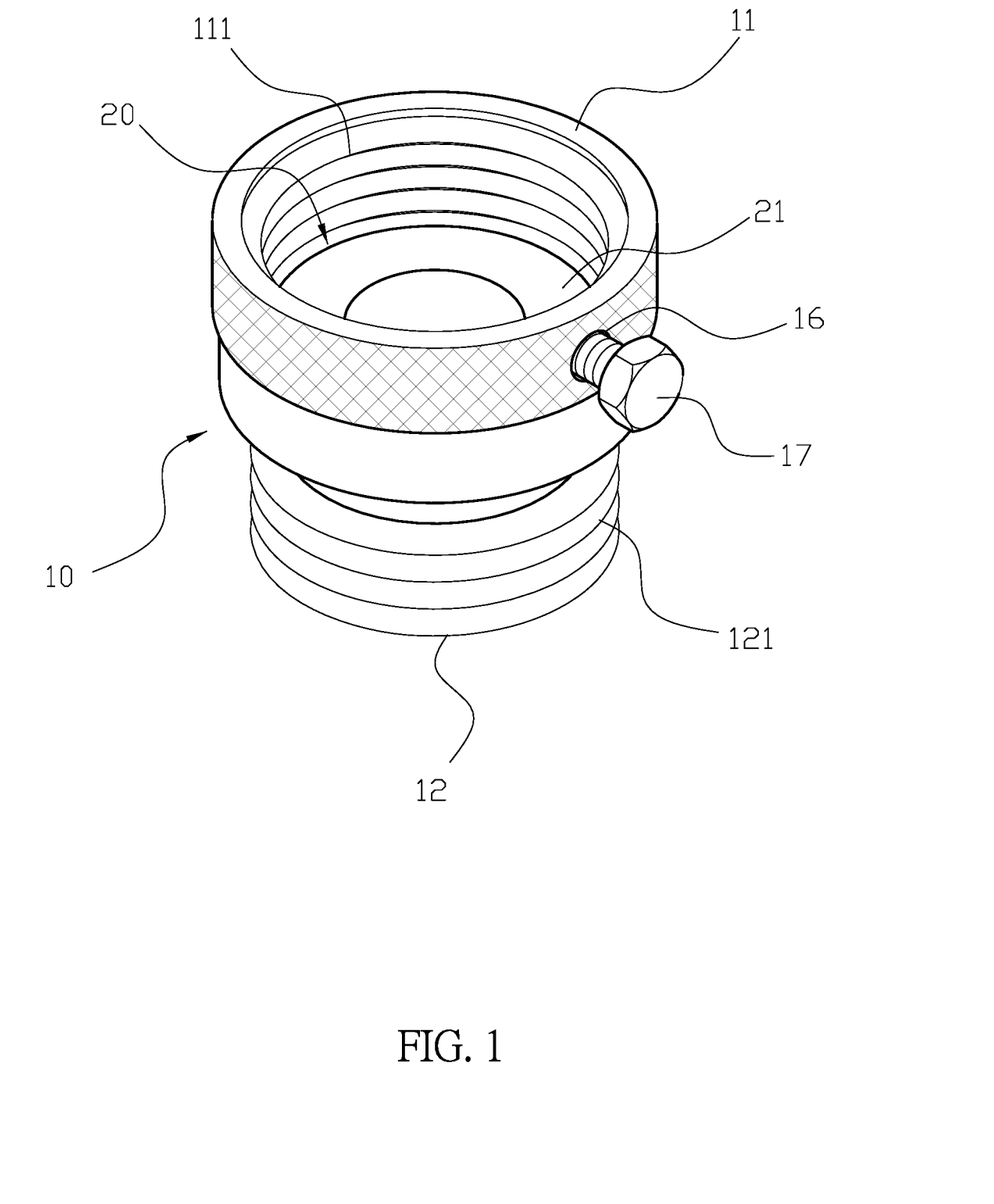
FIG. 1 is a perspective view of a preferred embodiment according to the present invention.
Figure 2:
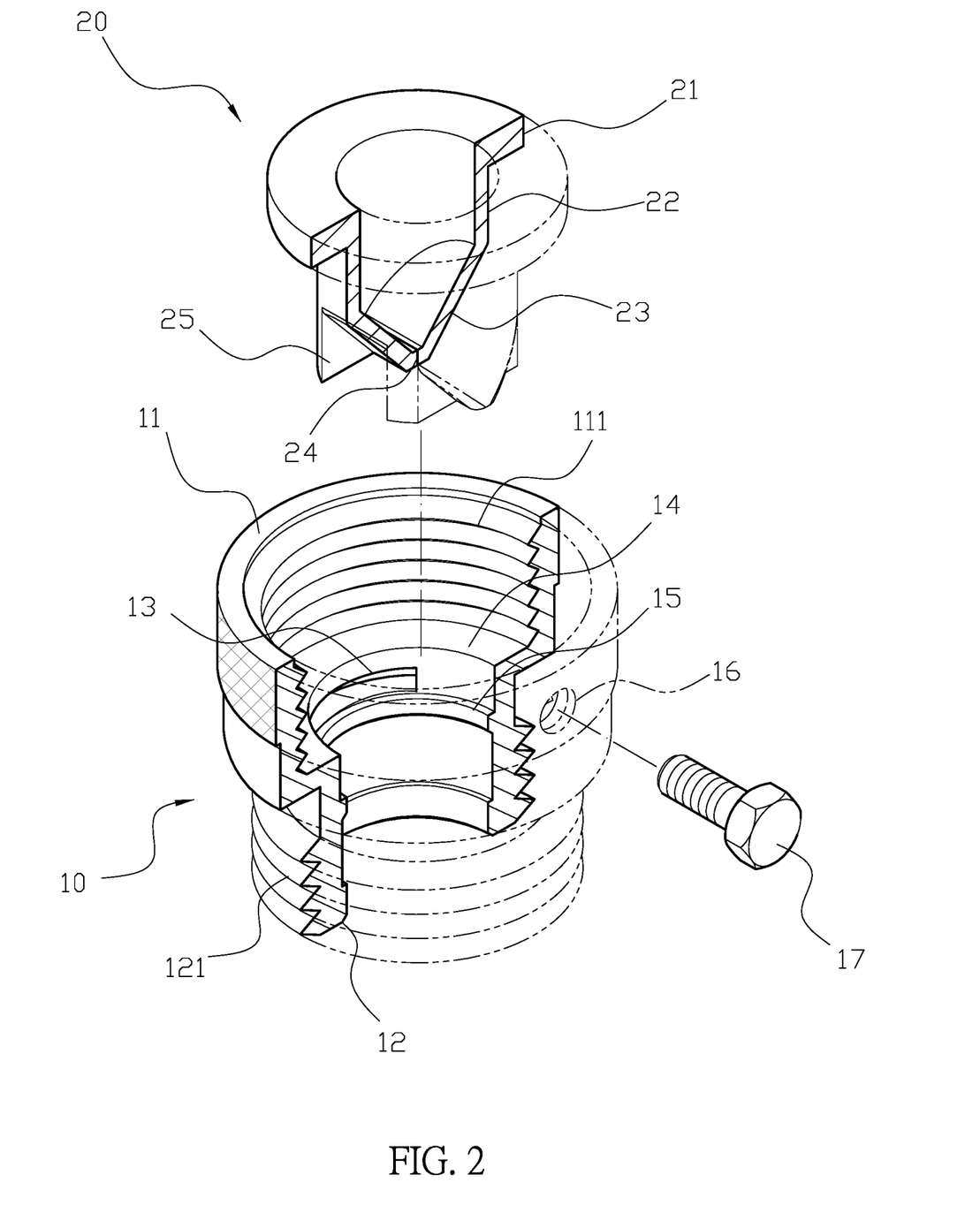
FIG. 2 is a perspective exploded and partial cross-sectional view of the preferred embodiment according to the present invention.
Figure 3:
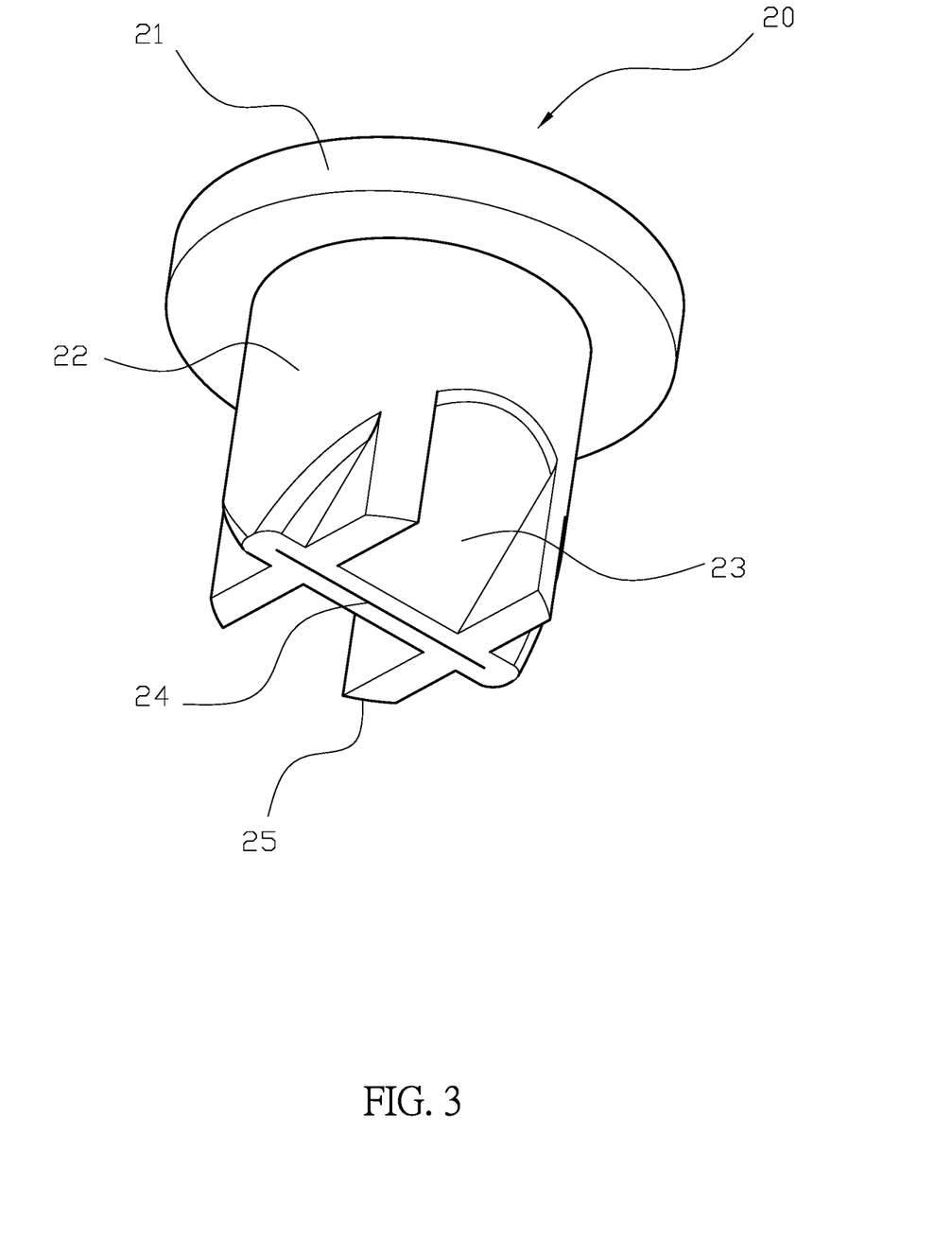
FIG. 3 is a perspective view of the elastic valve of the preferred embodiment according to the present invention.
Figure 4:
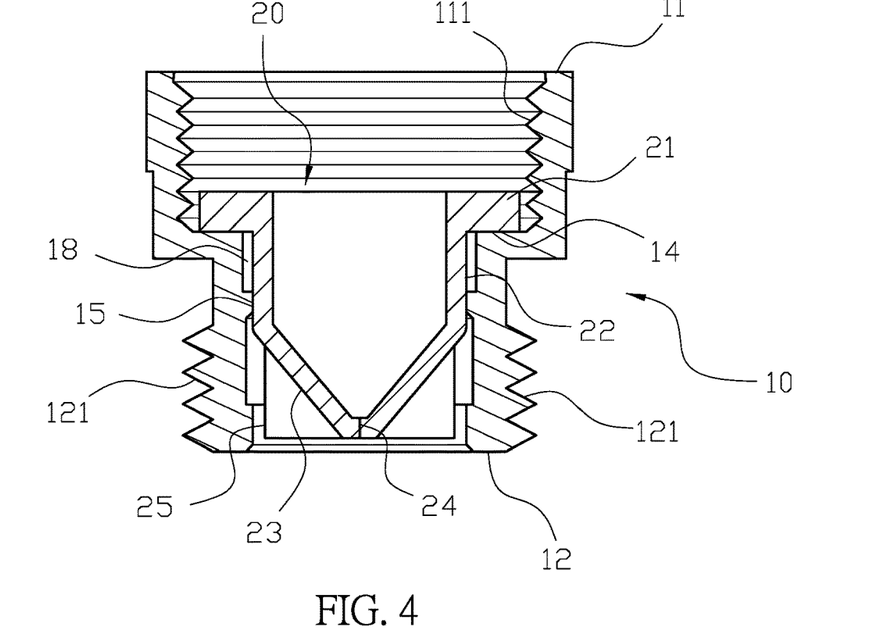
FIG. 4 is a cross-sectional view of the preferred embodiment according to the present invention.
Figure 5:
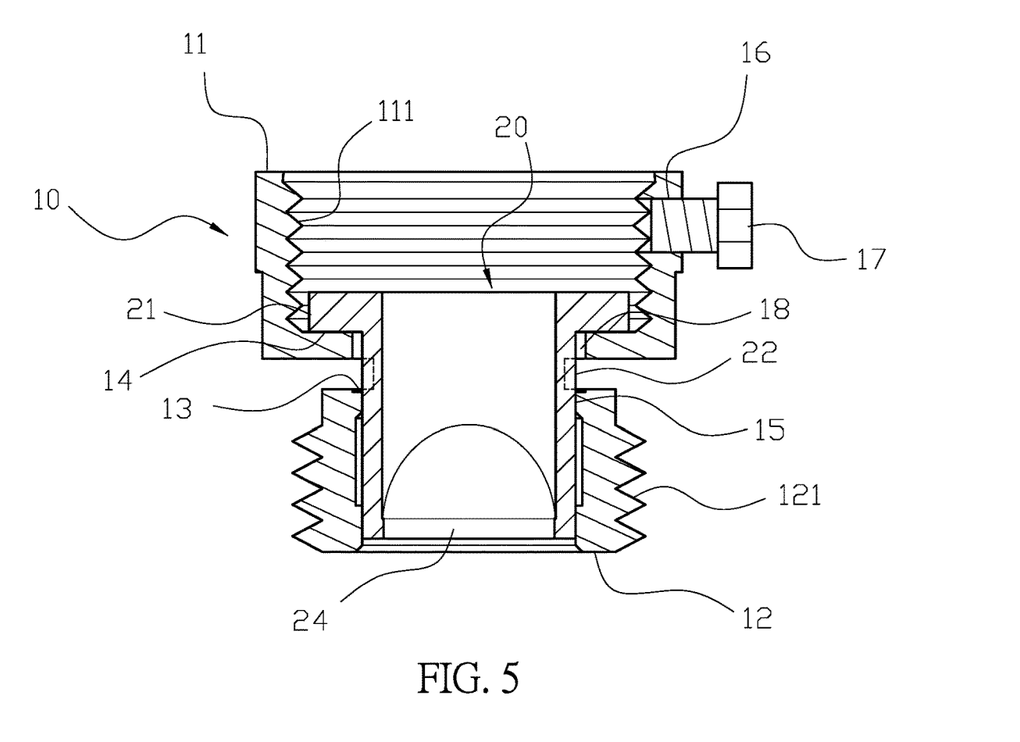
FIG. 5 is another cross-sectional view of the preferred embodiment according to the present invention.
Figure 6:
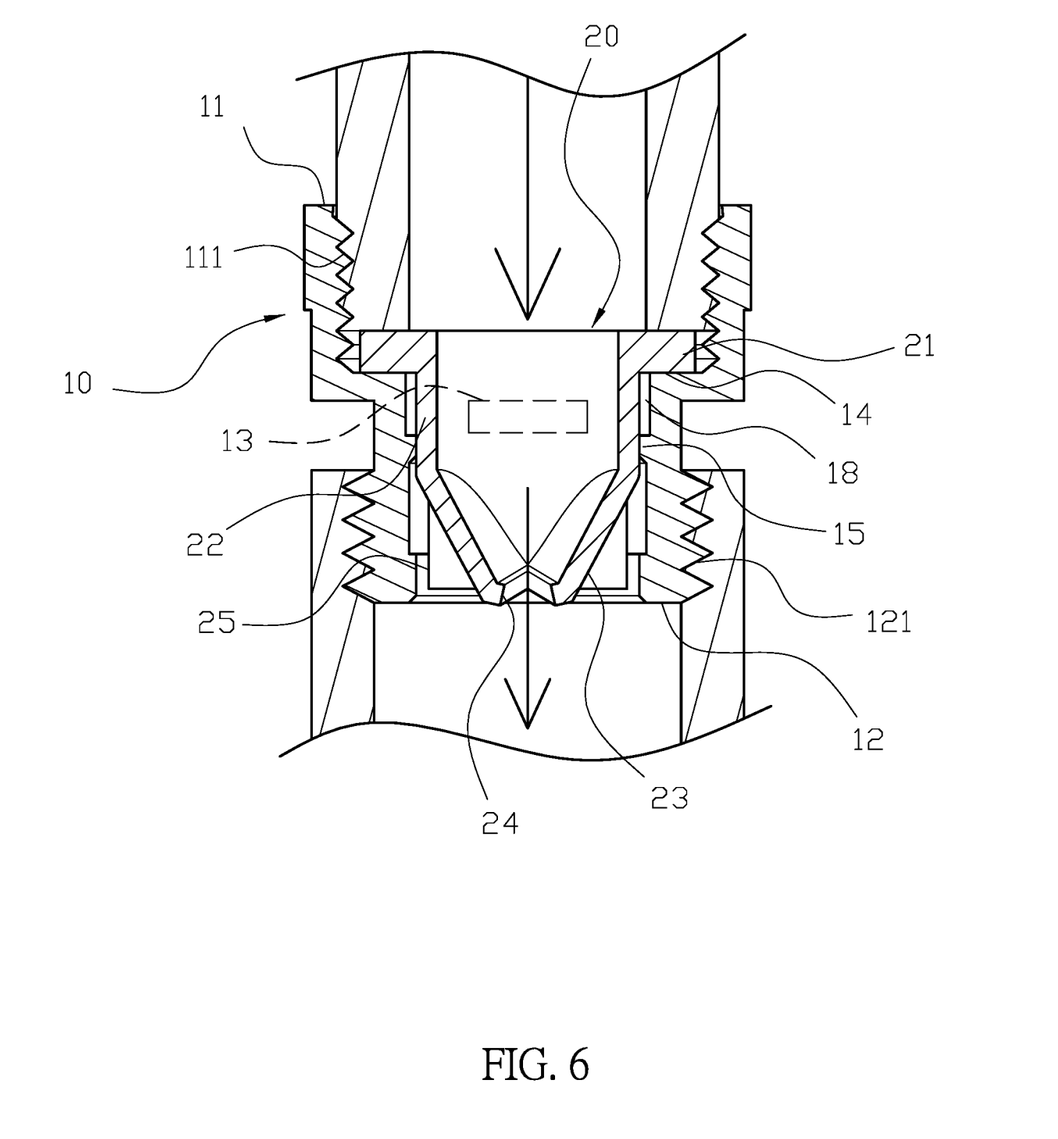
FIG. 6 is a schematic view of the preferred embodiment according to the present invention in a water supplying state.
Figure 7:
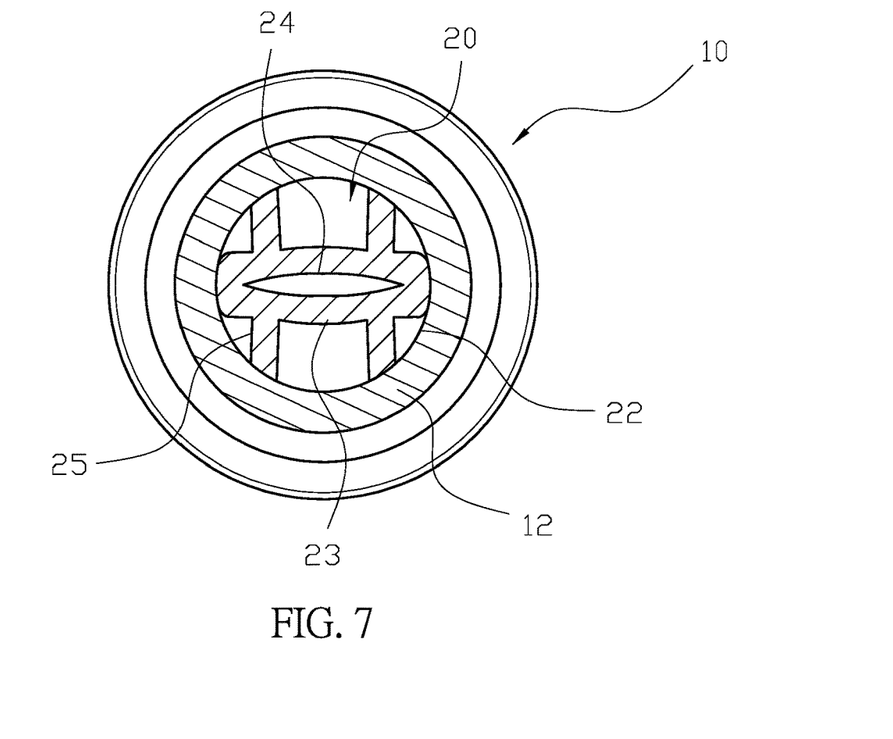
FIG. 7 is a cross-sectional view of the preferred embodiment according to the present invention in the water supplying state.
Figure 8:
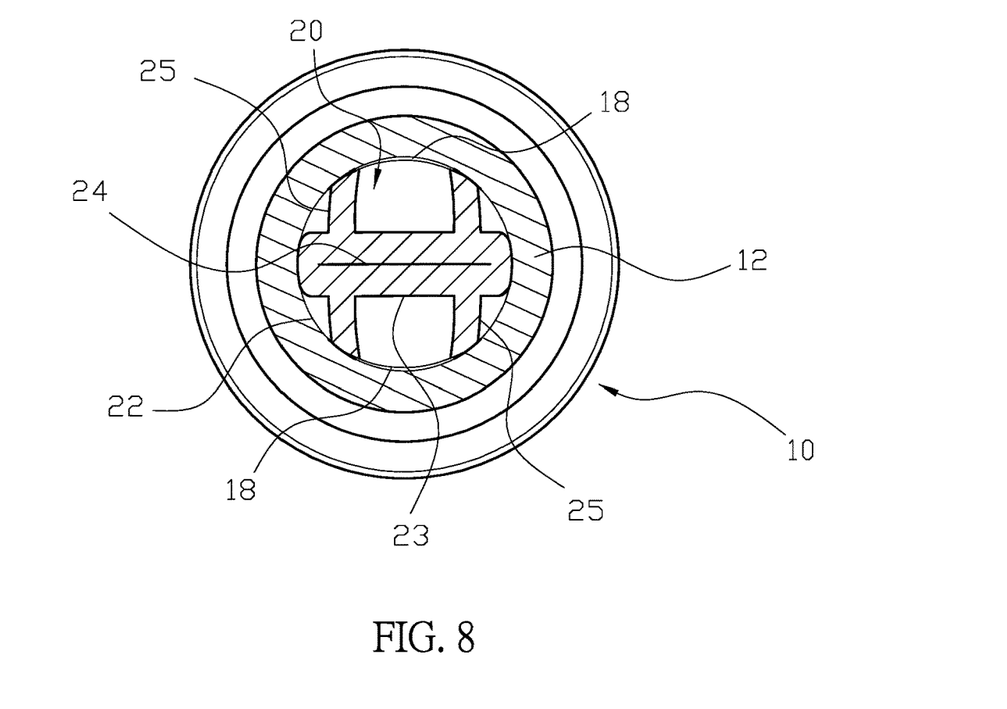
FIG. 8 is a cross-sectional view of the preferred embodiment according to the present invention in a vacuum breaking operation.
Figure 9:
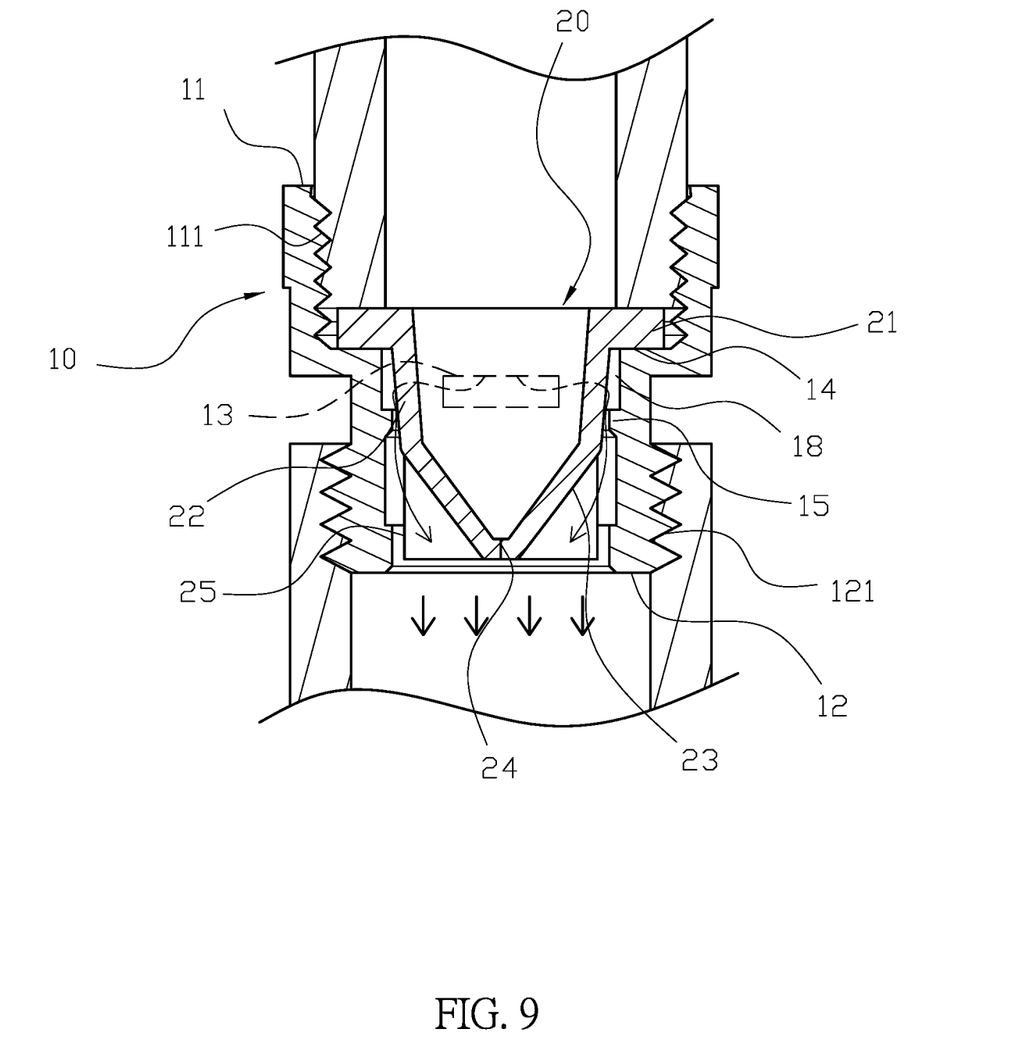
FIG. 9 is a schematic view of the preferred embodiment according to the present invention in a vacuum breaking operation.
Figure 10:
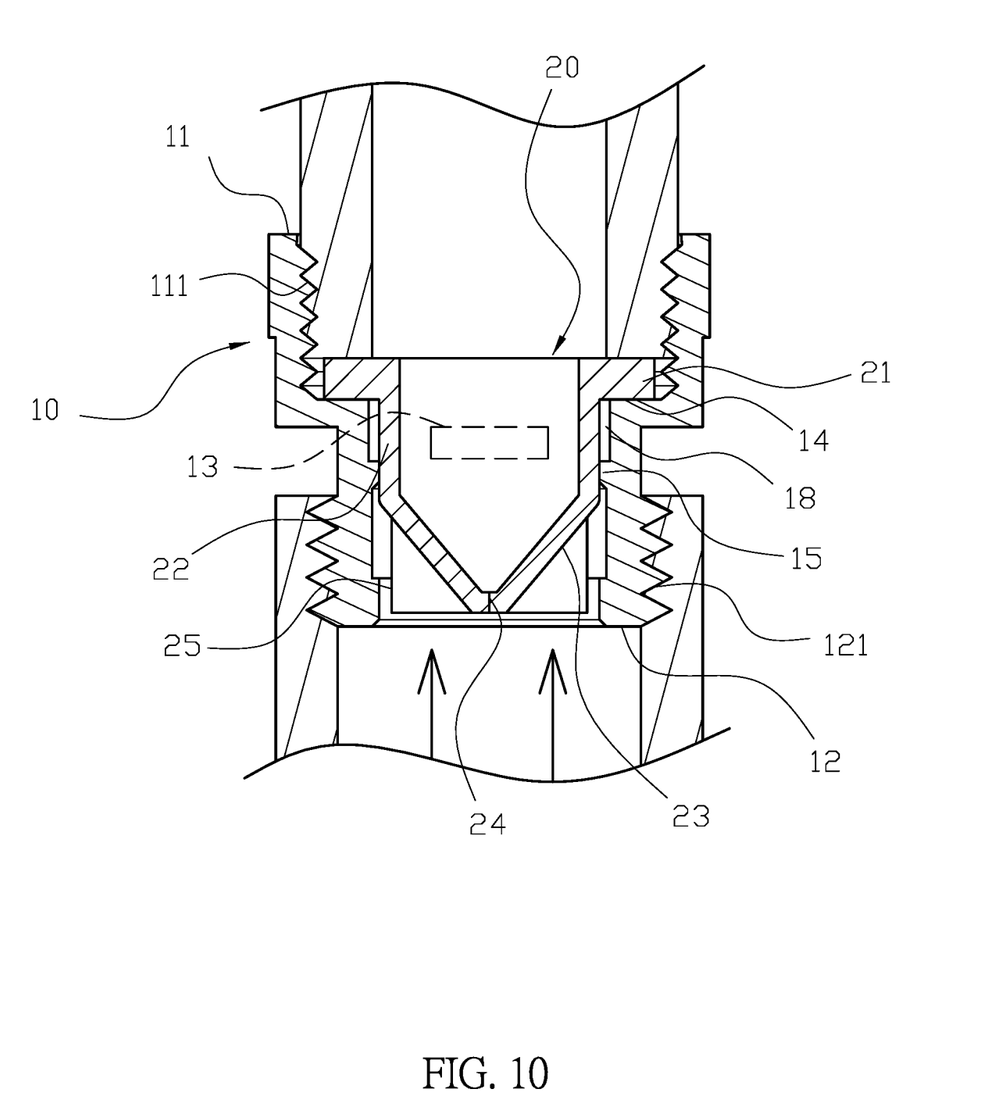
FIG. 10 is a schematic view of the preferred embodiment according to the present invention in a flow stop state.

For the actual operation, please refer to FIGS. 6, 7, 8, and 9 with FIG. 3. The elastic valve 20 is placed through the input end 11 of the tube body 10, so that the linear gap 24 of the elastic valve 20 faces the output end 12 of the tube body 10 and the ring 21 of the elastic valve 20 presses against the stopping portion 14 of the tube body 10. Meanwhile, the tubular portion 22 of the elastic valve 20 presses against the flange 15 of the tube body 10 to forms a connection between the elastic valve 20 and the tube body 10 with the chamber 18 of the venting opening 13. The input end 11 of the tube body 10 is connected at one end of the water an external pipe via the inner threaded section 111 and can be locked with the screw hole 16 by the bolt. The output end 12 of the tube body 10 is connected at one end of another external water pipe by the outer threaded section 121. Therefore, the tube body 10 is connected between the water pipes, when the water flows in a forward direction, the water flows from the input end 11 into the tube body 10, passes through the ring 21 and the tubular portion 22 of the elastic valve 20, provides a hydraulic thrust on the inner surfaces of the two inclined surfaces 23, the inclined surface 23 elastically deforms the linear gap 24 to open to allow the water flow to pass and exit from the output end 12 of the tube body 10. When the water is stopped, a negative pressure state is formed in the output end 12, and vacuum suction is generated on the inclined surface 23 of the elastic valve 20, thereby stretching the inclined surface 23. At this time, the tubular portion 22 is elastically deformed into an elliptical shape to open to the chamber 18, and external air is taken in by the venting opening 13 to achieve the vacuum breaking effect, thereby reducing the pressure of the output end 12. After the pressure reduction, the elastic valve 20 restores the unventilated state, so that the pipeline or the water equipment does not rupture. As shown in FIG. 10, when the water flow is reversed, the water flow flows from the output end 12 of the tube body 10 to the elastic valve 20, and the water pressure acts on the outside of the inclined surface 23 the elastic valve 20 which closes the linear gap 24 completely. Therefore, the tubular portion 22 of the elastic valve 20 makes tighter contact with the flange 15 of the tube body 10, which effectively prevents leaking from the venting opening 13.

With the above-described embodiment, the following benefits can be obtained: (1) the ring 21 of the elastic valve 20 presses against the stopping portion 14 of the tube body 10 and the tubular portion 22 of the elastic valve 20 pushes the flange 15 of the tube body 10, the tip of the inclined surface 23 faces toward the output end 12 of the tube body 10, so the pressure of the water flow pushes the inclined surfaces 23 to allow the water to pass through the linear gap; when the water flow is stopped, the vacuum suction generated in the output end 12 deforms the tubular portion 22 of the elastic valve 20 to open the venting opening 13, thereby introducing air to achieve vacuum breakage effect. Alternatively, when the water flow is reversed, the linear gap 24 is closed by the reserve water pressure applied onto the inclined surfaces 23, and the tubular portion 22 of the elastic valve 20 more closely attaches onto the flange 15 of the tube body 10, thereby achieving effectively stopping water. (2) The elastic valve 20 is installed inside the tube body 10, and the arrangement of the inclined surface 23 and the linear gap 24 of the elastic valve 20 is able to controls water flow back. Furthermore, the elastic deformation of the elastic valve 20 allows external air to enter into the tube body 10 from the venting opening 13, and the simple structure to achieve the function of vacuum breaking and stopping countercurrent water, it has the effect of both practicality and cost reduction.

Although the present invention has been explained in relation to its preferred embodiment, it is to be understood that many other possible modifications and variations can be made without departing from the spirit and scope of invention as hereinafter claimed.

What is claimed is:

1. A vacuum release valve comprising:
    a tube body having an input end and an output end, the tube body further having at least one venting opening at a middle section, a stopping portion provided between the input end and the at least one venting opening and extending from an inner wall of the tube body, and a flange provided between the output end and the at least one venting opening and extending from the inner wall; and
    an elastic valve having a ring with a first diameter, and a tubular portion with a second diameter being less than the first diameter extending from the ring and provided with two inclined surfaces at a distal end, the two inclined surfaces forming a linear gap there between, the elastic valve mounted in the tube body, the ring and the tubular portion respectively pushing against the stopping portion and the flange of the tube body, the at least one venting opening of the tube body fluidly disconnected from the output end by the tubular portion pushing against the flange, and the linear gap of the elastic valve faces the output end of the tube body;
    wherein when water flows through the vacuum release valve, the linear gap of the elastic valve is pushed open by water pressure; when water stops flowing, vacuum suction generated in the output end deforms the tubular portion of the elastic valve to cause the tubular portion to separate from the flange and the at least one venting opening to fluidly connect to the output end when the tubular portion separates from the flange, and when the inclined surfaces of the elastic valve are under reversed pressure, the linear gap and the at least one venting opening are closed;
    wherein the elastic valve further has at least one respective supporting portion formed at opposite ends of the two inclined surfaces, and each supporting portion pushes against an inside of the tube body to control deformation of the elastic valve, each supporting portion extending perpendicularly to the linear gap, and an outer edge of each supporting portion aligning with a surface of the tubular portion.

2. The vacuum release valve as claimed in claim 1, wherein the elastic valve is made of a rubber or a silicon material.

3. The vacuum release valve as claimed in claim 1, wherein the flange of the tube body makes partial contact with the tubular portion of the elastic valve, and a chamber is provided between the tube body and the elastic valve.

4. The vacuum release valve as claimed in claim 1, wherein the input end of the tube body is provided with an inner threaded section, and the output end is provided with an outer threaded section.

5. The vacuum release valve as claimed in claim 4, wherein the input end of the tube body is provided with a screw hole passing through the inner threaded section and engaging with a bolt, and the bolt passes through the tube body.

* * * * *